United States Patent Office 2,803,999
Patented Aug. 27, 1957

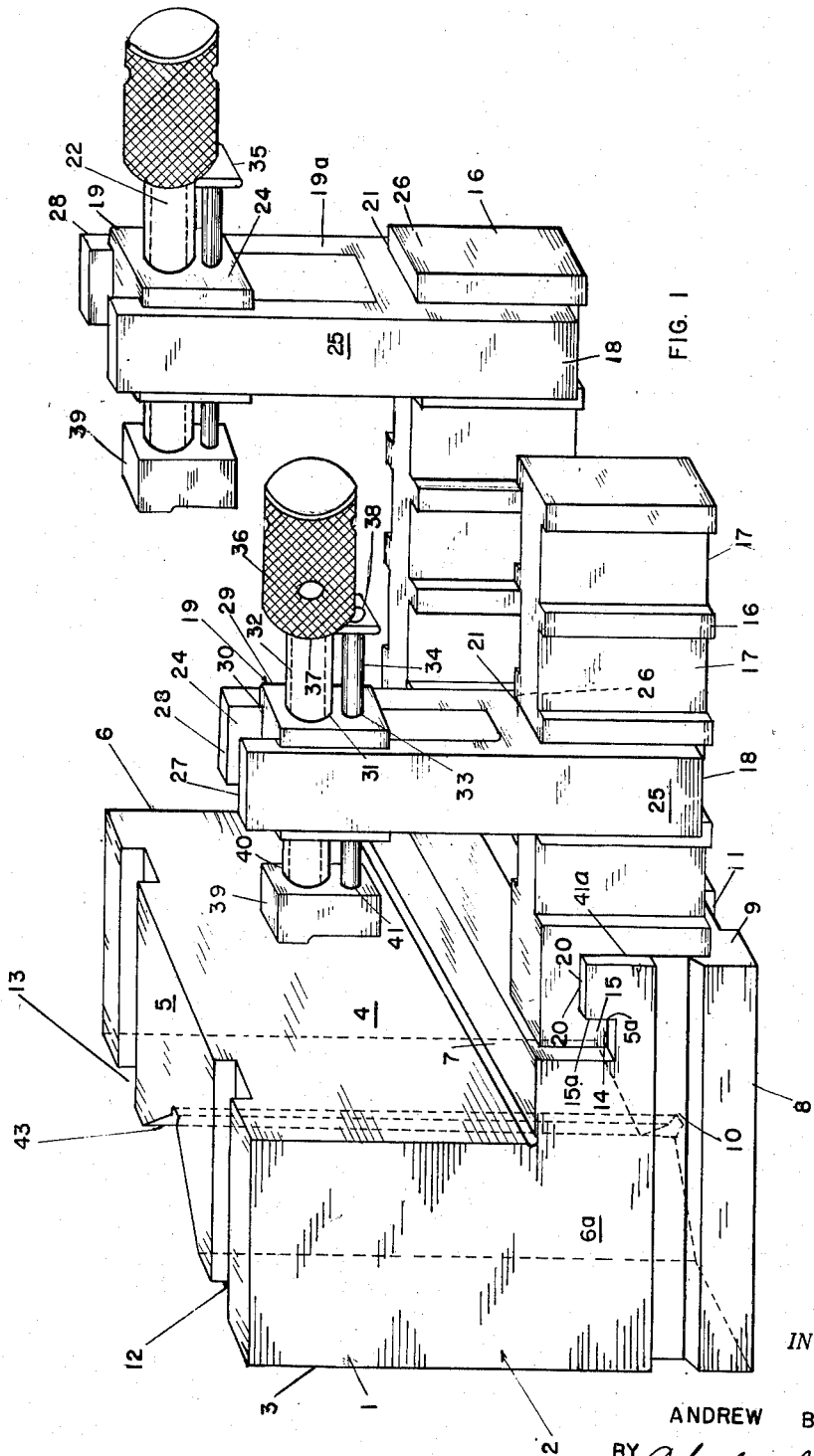

2,803,999

TOOL MAKER'S VISE

Andrew Beusch, Erie, Pa.

Application October 25, 1954, Serial No. 464,321

14 Claims. (Cl. 90—60)

This invention relates to vises and more particularly to machine vises for the purpose of holding articles in rigid position on the machine tools in order to obtain a high degree of accuracy of machine work.

Many of the vises which are used at the present time for clamping machine parts are subject to distortion, thereby resulting in inaccuracy of machining. Further, they are cumbersome and inconvenient to use.

It is, accordingly, an object of this invention to overcome the above and other defects and disadvantages in prior machine tool vises and, more particularly, it is an object to provide a vise for use on machine tools which is simple in construction, economical to manufacture, and simple and efficient to use.

Another object of the invention is to provide a vise for use on machine tools for clamping articles of work thereto which can be adjusted quickly to any position within the capacity of the device.

A further object of the invention is to provide a vise for clamping work to machine tools which will support the work in accurate square positions relative to the machine table.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a perspective view of a vise according to the invention.

Now with more specific reference to the drawing, a vise 1 is shown having a body portion 2 generally L-shaped. The body portion 2 has back surface 3 and clamping surface 4 machined perfectly parallel to each other and surfaces 5, 7, and 8 machined perfectly parallel to each other. Surfaces 6 and 6a are also parallel to each other. Surfaces 6 and 6a have clamping slots 10 machined therein. Top surface 5 has slots 12 and 13 machined therein and surface 8 has slots 11 machined therein. The rest surface 7 comprises an offset portion machined in the body portion 2 defining a right angle with surface 4 and the surface 20 is disposed somewhat lower than the surface 7 and forms a ledge. A slot 14 is disposed in the body member 2 between the surface 20 and the rest surface 7.

Bars 16 have parallel laterally disposed slots 17 formed therein which receive legs 18 having a slot 21 formed therebetween in the straps 25. The straps 25 are bifurcated at the ends thereof having the slot 21 therebetween to be received in the slots 17 as mentioned previously. The other ends of the strap members 25 are bifurcated, defining a slot 24 between arms 27 and 28 which receives the block 29 which carries the nut and jaw assembly 19. Legs 18 and 26 of the bifurcated strap members 25 are adapted to slide into the slots 17 and the arms 27 and 28 are adapted to receive the block 29 of the jaw assembly 19 therebetween. The block 29 has vertical slots 30 at either side thereof and the slots 30 receive the arms 27 and 28 of the bifurcated members 25. The block 29 has a threaded bore 31 which receives a screw 32 and an unthreaded bore 33 which slidingly receives the guide rod 34. A plate 35 is rotatably attached to a handle 36 which is attached to the screw 32 at 37 and the plate 35 is attached to the smooth rod 34 at 38. A movable jaw member 39 is attached to the threaded screw 32 at 40 and the screw 40 rotates therein. The guide rod 34 is attached and fixed to the movable jaw 39 at 41. The strap 19a has corresponding members to the strap 25.

The slots 10, 11, 12, and 13 are made in the various surfaces of the body 2 so that the body 2 can be clamped in rigid position to the table of a machine tool. A hook 15 defines one side of the slot 20a and has a perpendicular face 15a which engages a vertical face 50 on the hook member 15 and the flat surface 41a lies along the surface 9 in snug engagement therewith. It will be seen that when, for example, the surface 8 of the body 2 is rested on the table of the machine tool and the body 2 is rigidly clamped thereto by clamps in slots 10 or clamped in some similar manner, the surface 4 will be exactly perpendicular to the table. When a piece of work being machined is disposed against the clamping surface 4 and against the rest surface 7, the article will be in a vertical position. Then if the strap member 25 is put in the approximate adjacent position to the work with the legs 18 and 26 disposed in the proper slots 17, the handle 36 will be rotated to cause the screw 32 to bring the movable jaw 39 into rigid clamping relation with the article to be clamped. In this position, the article will be rigidly clamped and the surface of the article engaging the surface 4 will be perpendicular to the table and will be held in this rigid relation.

A vertical V-shaped slot 43 is formed in the back surface of the body member 2 which can be used for other machine operations when a tool of this nature is required.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A combined angle plate and clamping device comprising an angle plate having a horizontal portion having a top surface, a vertical portion having a front surface disposed at right angles to said top surface, said top surface terminating at the distal edge thereof in a front clamping surface parallel to said front surface, a ledge disposed on said front clamping surface having a top terminating below said top surface of said horizontal portion, a slot formed in said ledge parallel to said vertical surface, said ledge having a surface parallel to said vertical surface, a bar having a hook on one end thereof engaging said slot, and a movable jaw supported on said bar and movable into clamping relation to said vertical surface whereby articles may be clamped thereto.

2. The device recited in claim 1 wherein two said bars, each supporting a movable jaw, are disposed in spaced relation and connected to said transverse slot.

3. The device recited in claim 1 wherein slots are provided in said bar member and said strap member has a U-shaped end engaging said slots whereby said strap member is supported in vertical position.

4. The device recited in claim 1 wherein said angle plate has a portion extending downwardly from said horizontally extending portion, said bar having a portion thereof engaging said downwardly extending portion.

5. The combined angle plate and clamping device recited in claim 1 wherein a plurality of slots are provided in said angle plate.

6. A combined angle plate and clamping device comprising an angle plate having a horizontal and a vertical portion and a downwardly extending portion, said horizontal portion terminating at the front edge thereof in a vertical surface, a ledge attached to said vertical surface, a slot in said ledge extending generally parallel to said vertical portion, a bar having a hook and a downwardly extending portion thereon, said hook being spaced from a vertically extending portion of said bar and adapted to engage said downwardly extending portion when said hook is in engagement with said slot, vertical slots in the sides of said bar, a U-shaped strap member having the legs thereof engaging said vertically extending slots whereby said strap member is held in place, and means on said strap supporting a movable jaw in spaced relation to said vertical portion.

7. The device recited in claim 6 wherein said means supporting said movable jaw comprises spaced upwardly extending arms on said strap and a block having a vertically extending slot on either side thereof, said slots receiving said arms, and a threaded rod received in a threaded bore in said block supporting said movable jaw.

8. The device recited in claim 7 wherein a handle is attached to said threaded rod, and a second bore in said block generally parallel to said first bore, said threaded rod extending through said second bore and attached to said movable jaw whereby said movable jaw is held against rotation.

9. The device recited in claim 8 wherein clamping slots are disposed in the outer surface of said jaw whereby said device may be clamped to a machine.

10. The device recited in claim 9 wherein a plurality of said movable jaws are supported on said angle plate by means similar to said means for supporting said jaw.

11. A combined angle plate and clamping device comprising an angle plate having a body portion, a flat bottom surface and a top surface, a clamping surface extending generally perpendicular to said bottom surface, a rest surface spaced between said top and said bottom surfaces and extending parallel to said bottom surface, said rest surface terminating at the edge thereof remotest from said clamping surface in a groove, said groove being spaced inwardly from a downwardly extending front edge, said edge defining a ledge spaced below said surface, and clamping means having hooks thereon engaging said groove and said front edge whereby said clamping means is held in operative position.

12. The device recited in claim 11 wherein said clamping means comprises a strap member having said hooks engaging said groove, a downwardly extending portion engaging said front portion and extending parallel thereto, and spaced vertical slots in the sides of said strap member for receiving a clamping member.

13. The device recited in claim 12 wherein clamping members having spaced downwardly extending legs are supported on said strap members with said legs engaging vertically extending slots.

14. The device recited in claim 13 wherein said clamping members have vertically extending legs adapted to support a clamping block therebetween.

References Cited in the file of this patent

UNITED STATES PATENTS

| | | |
|---|---|---|
| 572,725 | Schweitzer | Dec. 8, 1896 |
| 2,406,514 | Squire | Aug. 27, 1946 |
| 2,472,083 | Bartholdy | June 7, 1949 |
| 2,484,339 | Fuhr | Oct. 11, 1949 |
| 2,671,366 | Beusch | Mar. 9, 1954 |